US008000880B2

(12) United States Patent
Shibata et al.

(10) Patent No.: US 8,000,880 B2
(45) Date of Patent: Aug. 16, 2011

(54) FUEL QUALITY DETECTION USING TORQUE AND ENGINE SPEED

(75) Inventors: Jonathan T. Shibata, Milan, MI (US); Kenneth J. Buslepp, Brighton, MI (US); Donovan L. Dibble, Utica, MI (US); Mary Beth Furness, Ann Arbor, MI (US)

(73) Assignee: GM Global Technology Operations LLC

( * ) Notice: Subject to any disclaimer, the term of this patent is extended or adjusted under 35 U.S.C. 154(b) by 293 days.

(21) Appl. No.: 12/120,828

(22) Filed: May 15, 2008

(65) Prior Publication Data
US 2009/0265081 A1 Oct. 22, 2009

Related U.S. Application Data

(60) Provisional application No. 61/045,407, filed on Apr. 16, 2008.

(51) Int. Cl.
*G06F 17/00* (2006.01)
*F02M 51/00* (2006.01)
(52) U.S. Cl. ......... 701/104; 123/486; 701/110; 701/115
(58) Field of Classification Search .......... 701/101–105, 701/110, 112, 115; 123/403, 478, 480, 492, 123/497, 486, 494; 73/114.38, 118.01, 118.02
See application file for complete search history.

(56) References Cited

U.S. PATENT DOCUMENTS

| | | | | |
|---|---|---|---|---|
| 6,522,024 B1 * | 2/2003 | Takaoka et al. | ............. | 290/40 C |
| 6,704,638 B2 | 3/2004 | Livshiz | .......................... | 701/102 |
| 6,712,503 B2 * | 3/2004 | Lin et al. | .......................... | 374/45 |
| 6,817,342 B2 * | 11/2004 | Schule | .......................... | 123/486 |
| 6,935,311 B2 * | 8/2005 | Visser et al. | ............. | 123/406.47 |
| 7,059,313 B2 * | 6/2006 | Lippa | ............................. | 123/685 |
| 7,128,057 B2 * | 10/2006 | Wiese et al. | .................. | 123/494 |
| 7,367,223 B2 * | 5/2008 | Kettl et al. | .................... | 73/53.05 |
| 2002/0040692 A1* | 4/2002 | LaPointe et al. | .......... | 123/27 GE |
| 2004/0069273 A1 | 4/2004 | Visser et al. | | |
| 2007/0163542 A1* | 7/2007 | Kettl et al. | ..................... | 123/435 |

FOREIGN PATENT DOCUMENTS

| | | |
|---|---|---|
| DE | 10346314 A1 | 4/2004 |
| DE | 60122255 T2 | 6/2007 |
| EP | 1178203 A2 | 2/2002 |
| EP | 1775584 A2 | 4/2007 |
| JP | 0915877 A | 6/1997 |
| JP | 2004270473 A * | 9/2004 |

* cited by examiner

*Primary Examiner* — Willis R Wolfe, Jr.
*Assistant Examiner* — Johnny H Hoang

(57) ABSTRACT

An engine control system comprises a fuel quality calculation module and a fueling module. The fuel quality calculation module calculates a fuel quality value for fuel provided to an engine based on at least one operating parameter of the engine. The fueling module selectively increases an amount of fuel provided to the engine based on the fuel quality value.

22 Claims, 4 Drawing Sheets

US 8,000,880 B2

FUEL QUALITY DETECTION USING TORQUE AND ENGINE SPEED

This application claims the benefit of U.S. Provisional Application No. 61/045,407, filed on Apr. 16, 2008. The disclosure of the above application is incorporated herein by reference.

FIELD

The present disclosure relates to internal combustion engines and more particularly to fuel quality.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 for a vehicle is presented. The engine system 100 includes an engine 102 that produces drive torque. Air is drawn into the engine 102 through an intake manifold 104. A throttle valve 106 varies the volume of air drawn into the intake manifold 104. The throttle valve 106 is actuated by an electronic throttle controller (ETC) 108, thereby controlling opening of the throttle valve 106. The air mixes with fuel from a fuel injector 110 to form an air and fuel mixture.

The air/fuel mixture is combusted within one or more cylinders of the engine 102, such as cylinder 112. In various engine systems, such as the engine system 100, combustion of the air/fuel mixture is initiated by spark provided by a spark plug 114. Exhaust gas resulting from combustion is expelled from the cylinders to an exhaust system 116. The exhaust system 116 includes an oxygen (O2) sensor 118 that outputs the concentration of oxygen in exhaust gas passing the oxygen sensor 118.

A driver instructs the engine 102 to start, and an engine control module (ECM) 130 then activates a starter (not shown) to start the engine 102. For example, the driver may turn a key and/or push a button to instruct the engine 102 to start. A driver input module 132 relays the driver's instruction to start the engine 102 to the ECM 130.

After the engine 102 is started, the ECM 130 regulates airflow into the engine 102 via the throttle valve 106 and the amount of fuel injected via the fuel injector 110. In this manner, the ECM 130 regulates the air/fuel mixture. The ECM 130 may regulate the air/fuel mixture to maintain a stoichiometric air/fuel mixture. The ECM 130 may also adjust the air/fuel mixture based on the output of the oxygen sensor 118.

After the engine 102 is started, however, the output of the oxygen sensor 118 may be unreliable until the temperature of the oxygen sensor 118 reaches a temperature threshold. When the output of the oxygen sensor 118 is unreliable, the ECM 130 may regulate the air/fuel mixture in an open-loop mode. In the open-loop mode, the ECM 130 regulates the air/fuel mixture without considering the output of the oxygen sensor 118.

The ECM 130 may estimate that the output of the oxygen sensor 118 will be reliable, for example, when a timer expires after the output of the oxygen sensor 118 leaves a calibratable voltage window. For example only, the ECM 130 may estimate that the output of the oxygen sensor 118 will be reliable twenty (20) seconds after the output leaves a voltage window between 200 mV and 600 mV. In such implementations, the ECM 130 may estimate that the output of the oxygen sensor 118 will be reliable approximately thirty-five (35) seconds after the engine 102 is started.

SUMMARY

An engine control system comprises a fuel quality calculation module and a fueling module. The fuel quality calculation module calculates a fuel quality value for fuel provided to an engine based on at least one operating parameter of the engine. The fueling module selectively increases an amount of fuel provided to the engine based on the fuel quality value.

In other features, the fueling module increases the amount of fuel when the fuel quality value is greater than a predetermined value.

In still other features, the fuel quality calculation module calculates the fuel quality value based on a torque of the engine and a first change in engine speed (RPM) measured over a first period. In further features, the torque is an estimated torque for the first period.

In still further features, the fuel quality calculation module calculates the fuel quality value further based on a calibrated torque for the first period and a calibrated RPM change for the first period. In other features, the calibrated torque and the calibrated RPM change are set based on a second fuel having a predetermined fuel quality value.

In still other features, the fueling module decreases the amount of the fuel provided to the engine when a second RPM change measured over a second period is less than a predetermined RPM change, wherein the second period is after the first period.

In further features, the engine control system further comprises an open-loop mode module. The open-loop module selectively activates and deactivates an open-loop mode of an engine controller and prevents the fueling module from increasing the amount of the fuel while an open-loop mode is deactivated.

In still further features, the fueling module determines an increased amount of the fuel based on the fuel quality value and increases the amount of fuel based on the increased amount.

In other features, the fuel quality value corresponds to a driveability index (DI) value.

A method for controlling an engine comprises calculating a fuel quality value for fuel provided to the engine based on at least one operating parameter of the engine, and selectively increasing an amount of fuel provided to the engine based on the fuel quality value.

In other features, the amount of fuel is increased when the fuel quality value is greater than a predetermined value.

In still other features, the fuel quality value is calculated based on a torque of the engine and a first change in engine speed (RPM) measured over a first period. In further features, the torque is an estimated torque for the first period.

In still further features, the method further comprises calculating the fuel quality value further based on a calibrated torque for the first period and a calibrated RPM change for the first period.

In other features, the calibrated torque and the calibrated RPM change are set based on a second fuel having a predetermined fuel quality value.

In further features, the method further comprises decreasing the amount of the fuel provided to the engine when a second RPM change measured over a second period is less than a predetermined RPM change, wherein the second period is after the first period.

In other features, the method further comprises selectively activating and deactivating an open-loop mode of an engine controller and preventing the increasing the amount of fuel while the open-loop mode is deactivated.

In still other features, the method further comprises determining an increased fuel amount based on the fuel quality value, wherein the amount of fuel is increased based on the increased fuel amount.

In other features, the fuel quality value corresponds to a driveability index (DI) value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
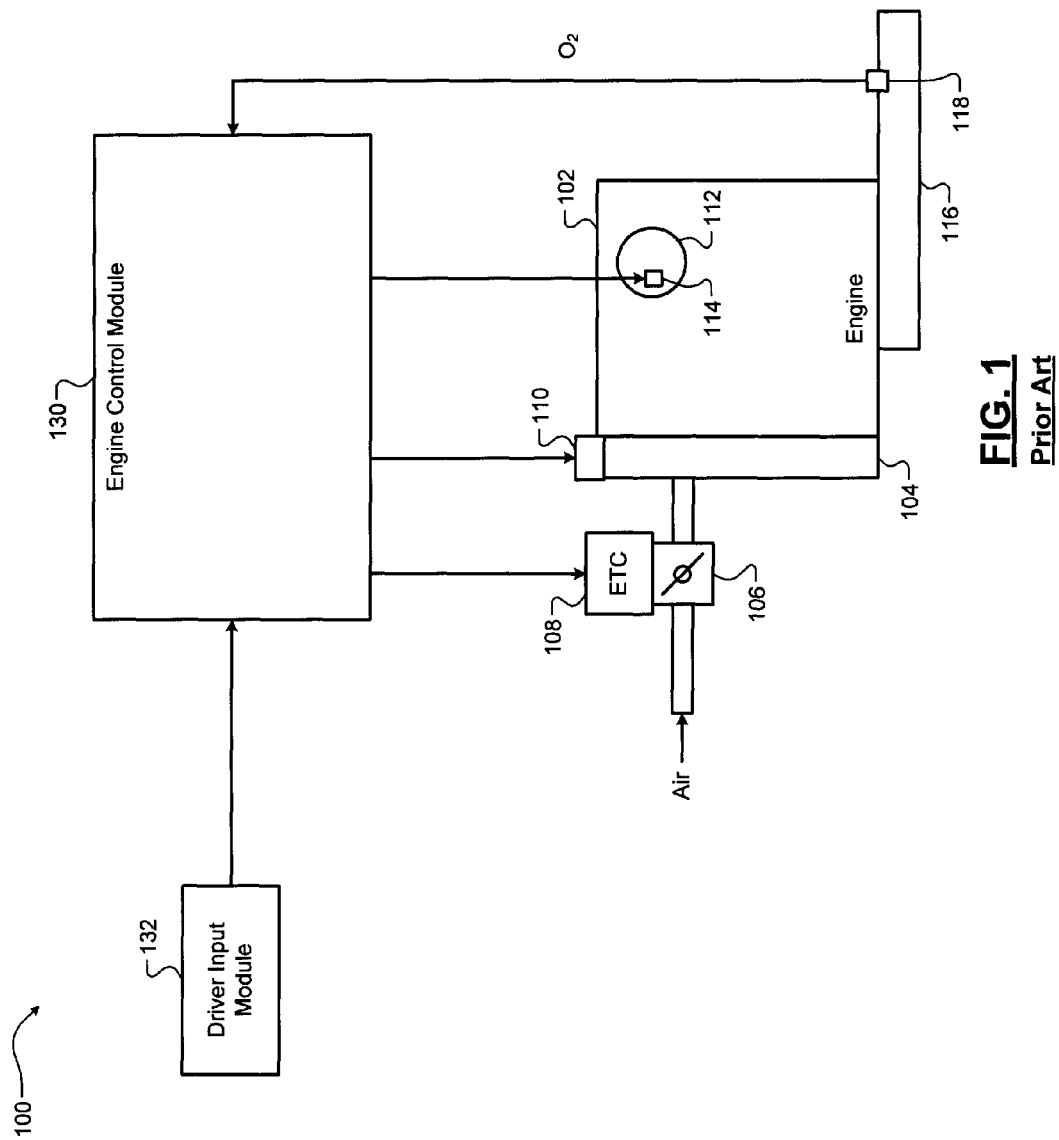
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller regulates the air/fuel mixture provided to an engine at approximately a stoichiometric mixture. The engine controller may adjust the air/fuel mixture based on an output of an oxygen sensor that measures concentration of oxygen in exhaust gas produced by the engine. After the engine is started, however, the output of the oxygen sensor may be unreliable. Accordingly, the engine controller regulates the air/fuel mixture independent of the output of the oxygen sensor (i.e., operates in open-loop mode) for a period of time after the engine is started.

Quality of a fuel may be measured in terms of the fuel's drivability index (DI). The DI of the fuel may be determined based on temperatures at which various percentages of the fuel vaporize. For example, fuel quality decreases as the DI increases. A fuel having poor fuel quality may be unable to vaporize to the extent expected when the temperature of the engine is low, such as after the engine is started. Inability to vaporize as expected may therefore affect combustion.

The engine controller according to the present disclosure determines whether the fuel quality is poor while the engine controller is operating in the open-loop mode. More specifically, the engine controller determines whether the fuel quality is poor based on torque and changes in engine speed. If the fuel quality is poor, the engine controller increases the amount of fuel provided to the engine.

Figure 2:
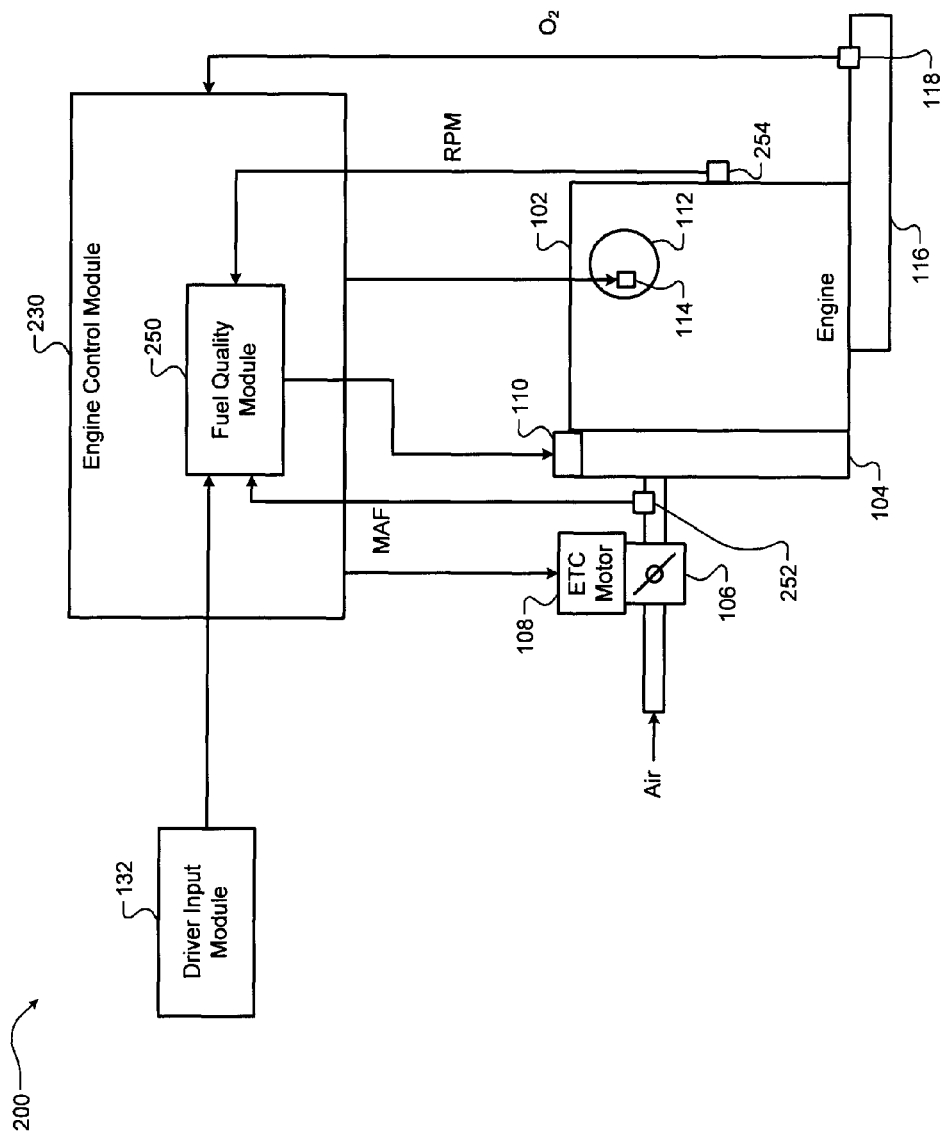
FIG. 2 is a functional block diagram of an exemplary engine system according to the principles of the present disclosure.

Referring now to FIG. 2, a functional block diagram of an exemplary engine system 200 is presented. The engine system 200 includes the engine 102 that combusts an air/fuel mixture to produce drive torque. Air is drawn into the intake manifold 104 through the throttle valve 106. The electronic throttle controller (ETC) 108 controls the opening of the throttle valve 106.

An engine control module (ECM) 230 regulates opening of the throttle valve 106 via the ETC 108. In this manner, the ECM 230 controls the amount of air drawn into the intake manifold 104. Air from the intake manifold 104 is drawn into cylinders of the engine 102. While the engine 102 may include multiple cylinders, for illustration purposes, only the representative cylinder 112 is shown. For example only, the engine 102 may include 2, 3, 4, 5, 6, 8, 10, and/or 12 cylinders.

The ECM 230 also regulates the amount of fuel injected by the fuel injector 110. For example, the ECM 230 may generate a pulse for a predetermined period of time. The fuel injector 110 may open while the pulse is generated. Accordingly, the amount of fuel injected by the fuel injector 110 may be adjusted by adjusting the length of time that the pulse is generated (i.e., the pulse width). The fuel injector 110 may inject fuel into the intake manifold 104 at a central location or at multiple locations, such as near the intake valve of each of the cylinders. Alternatively, the fuel injector 110 may inject fuel directly into the cylinders. In various implementations, one fuel injector is provided for each cylinder.

The injected fuel mixes with the air and creates the air/fuel mixture. A piston (not shown) compresses the air/fuel mixture within the cylinder 112. The spark plug 114 is energized, thereby igniting the air/fuel mixture. The timing of the energization of the spark plug 114 may be referred to as spark timing. The spark timing may be specified relative to a predetermined position of the piston, such as piston top-dead-center (TDC). Although the engine 102 is depicted as including the spark plug 114, the engine 102 may be any suitable type of engine, such as a compression combustion type engine or a hybrid type engine and may not include the spark plug 114.

Combustion of the air/fuel mixture drives the piston down, rotatably driving a crankshaft (not shown), thereby producing torque. The byproducts of combustion (i.e., exhaust gas) are expelled from the cylinder 112 into the exhaust system 116. The exhaust system 116 includes the oxygen ($O_2$) sensor 118 that measures and outputs the concentration of oxygen in the exhaust gas passing the oxygen sensor 118.

Generally, the ECM 230 regulates the air/fuel mixture to maintain a stoichiometric air/fuel mixture. The ECM 230 then adjusts the air/fuel mixture based on the output of the oxygen sensor 118. The output of the oxygen sensor 118, however, may be unreliable when the temperature of the oxygen sensor 118 is less than a threshold temperature. For example, the temperature of the oxygen sensor 118 is likely less than the threshold temperature for a period of time after the engine 102 is started.

Accordingly, the ECM 230 operates in an open-loop mode after the engine 102 is started. The ECM 230 regulates the air/fuel mixture independent of the output of the oxygen sensor 118 while operating in the open-loop mode. Quality of the fuel provided to the engine 102, however, may affect the air/fuel mixture. More specifically, the air/fuel mixture may effectively be lean (less fuel than the stoichiometric mixture) when the fuel quality is poor. This lean quality of the air/fuel mixture may be attributable to the inability of the fuel to vaporize and combust to the extent expected when the engine temperature is low.

Generally quality of a fuel is measured in terms of the fuel's drivability index (DI). DI for a fuel may be determined based on temperatures at which various percentages of the fuel vaporize. For example only, DI of a fuel may be determined using the equation:

$$DI = 1.5 * T_{10} + 3.0 * T_{50} + T_{90},$$

where $T_{10}$ is the temperature (° F.) at which 10% of the fuel is vaporized, $T_{50}$ is the temperature (° F.) at which 50% of the fuel is vaporized, and $T_{90}$ is the temperature (° F.) at which 90% of the fuel is vaporized. For example only, fuel quality decreases as DI increases. In other words, a poor quality fuel has a higher DI than a higher quality fuel. Poor quality fuels may be unable to vaporize to the extent expected when the engine temperature is low.

For example, as stated above, the engine temperature is likely low when the ECM 230 is operating in the open-loop mode. Accordingly, the fuel injected may be unable to vaporize to the extent expected during the open-loop mode if the fuel quality is poor. Fuel that fails to vaporize may be only partially combusted or not combusted. Incomplete or non-combustion may affect emissions, cause the engine 102 to stall, and/or cause observable vibrations within the vehicle.

The ECM 230 includes a fuel quality module 250 that determines a fuel quality value for fuel provided to the engine 102. The fuel quality module 250 determines whether the quality of the fuel is poor based on the fuel quality value. If so, the fuel quality module 250 increases the amount of fuel provided to the engine 102.

Figure 3:
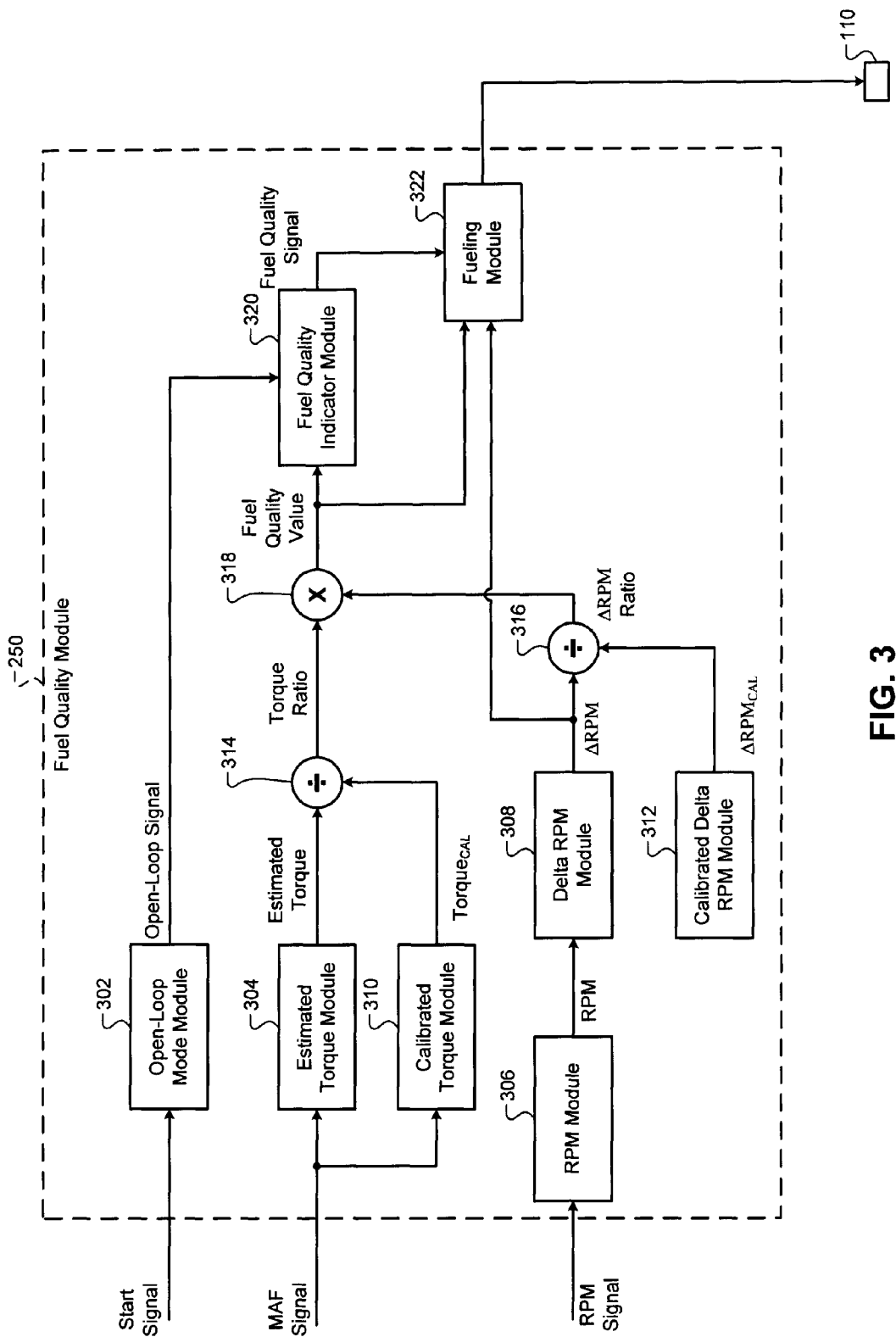
FIG. 3 is a functional block diagram of an exemplary implementation of a fuel quality module according to the principles of the present disclosure.

Referring now to FIG. 3, a functional block diagram of an exemplary implementation of the fuel quality module 250 is presented. The fuel quality module 250 includes an open-loop mode module 302 that activates the open-loop mode after the engine 102 is started. The open-loop mode module 302 also deactivates the open-loop mode when the output of the oxygen sensor 118 is likely reliable. The open-loop mode module 302 generates an open-loop signal, which indicates whether the open-loop mode is active.

The fuel quality module 250 also includes an estimated torque module 304, an engine speed (RPM) module 306, and a delta RPM module 308. The estimated torque module 304 determines an estimated torque value. The estimated torque value may represent an estimated amount of torque that the engine 102 is capable of producing under the current operating conditions.

For example only, the operating conditions may include the mass airflow (MAF), intake air temperature (IAT), oil temperature (OT), engine coolant temperature (ECT), spark timing, and/or any suitable operating conditions. In various implementations, the estimated torque value may also be determined based on characteristics of the engine 102, such as engine friction and/or any other suitable engine characteristics. The MAF signal is provided by a MAF sensor 252, which measures mass flow rate of air drawn into the intake manifold 104.

The spark timing may be set to a predetermined spark timing, such as a minimum spark timing (advance) at which the engine 102 can produce a maximum amount of torque (MBT spark timing). In other implementations, the spark timing may be retarded with respect to the MBT spark timing. In such implementations, the estimated torque module 304 may reduce the estimated torque value based on the decrease in torque attributable to the retarded spark timing. The estimated torque value may also be determined based on intake and exhaust cam phaser positions and/or positions of intake and exhaust valves (not shown) associated with the cylinder 112. Further discussion of torque estimation can be found in commonly assigned U.S. Pat. No. 6,704,638 entitled "Torque Estimator for Engine RPM and Torque Control," the disclosure of which is incorporated herein by reference in its entirety.

The RPM module 306 determines RPM values based on an RPM signal from an RPM sensor 254. The RPM sensor 254 generates the RPM signal based upon, for example, rotation of a crankshaft (not shown). The RPM module 306 determines an RPM value for each cylinder of the engine 102. For example only, the RPM value for one of the cylinders may be the RPM measured at a predetermined time (i.e., piston position). This timing may be specified relative to the occurrence of a firing (combustion) event within that cylinder, such as a predetermined time after the firing event. The RPM module 306 provides the RPM value to the delta RPM module 308.

The delta RPM module 308 determines a delta RPM (ΔRPM) value based on two of the RPM values provided by the RPM module 306 and the period of time between the two RPM values. For example only, the ΔRPM value may be determined using the equation:

$$\Delta RPM = \frac{RPM_2 - RPM_1}{t},$$

where $RPM_1$ is an RPM value for a first cylinder, $RPM_2$ is an RPM value for a second cylinder, and t is the period of time between $RPM_1$ and $RPM_2$. It should be noted that the $RPM_2$ is provided after $RPM_1$. Combustion within the cylinders of the engine 102 may be initiated in a predetermined order. This order may be referred to as a firing order. In various implementations, the second cylinder may be the cylinder immediately after the first cylinder in the firing order.

The fuel quality module 250 also includes a calibrated torque module 310 and a calibrated delta RPM module 312. The calibrated torque module 310 determines a calibrated torque value (torque$_{CAL}$). The calibrated torque value corresponds to the amount of torque that the engine 102 is capable of producing under similar operating conditions when combusting a fuel having a known fuel quality. For example only, the fuel may be known to be of a minimum acceptable quality.

The calibrated torque module 310 may determine the calibrated torque value based on the MAF, the IAT, the ECT, the spark timing, and/or any suitable operating condition. Additionally, the calibrated torque value may be determined based on characteristics of the engine 102, such as engine friction and/or any other suitable engine characteristics.

The calibrated delta RPM module 312 determines a calibrated ΔRPM value (ΔRPM$_{CAL}$). The calibrated ΔRPM value may correspond to a maximum allowable ΔRPM. For example, the calibrated ΔRPM value may be set to a maximum ΔRPM that may be experienced when combusting the fuel of known quality. As stated above, this fuel may be, for example, a fuel having a minimum acceptable fuel quality. In other words, the calibrated ΔRPM value may correspond to a maximum ΔRPM over the period between two firing events that may occur when the fuel of known quality is combusted in the engine 102.

A torque ratio module 314 receives the estimated torque value from the estimated torque module 304 and the calibrated torque value from the calibrated torque module 310. The torque ratio module 314 determines a torque ratio based on the estimated torque value and the calibrated torque value. For example only, the torque ratio may be determined using the equation:

$$\text{Torque Ratio} = \frac{\text{Estimated Torque Value}}{\text{Calibrated Torque Value}}.$$

In other words, the torque ratio may be equal to the estimated amount of torque that the engine 102 is capable of producing divided by the amount of torque that the engine 102 is capable of producing while combusting the fuel of known quality.

Similarly, a delta RPM ratio module 316 receives the ΔRPM value from the delta RPM module 308 and the calibrated ΔRPM value from the calibrated delta RPM module 312. The delta RPM ratio module 316 determines a ΔRPM ratio based on the ΔRPM value and the calibrated ΔRPM value. For example only, the ΔRPM ratio may be determined using the equation:

$$\Delta RPM \text{ Ratio} = \frac{\Delta RPM \text{ Value}}{\text{Calibrated } \Delta RPM \text{ Value}}.$$

In other words, the ΔRPM ratio may be equal to the change in RPM measured over a period of time divided by a maximum allowable change in RPM that may occur during that period when combusting the fuel of known quality.

A fuel quality calculation module 318 calculates a fuel quality value based on the torque ratio and the ΔRPM ratio. The fuel quality value may represent the quality of the fuel provided to the engine 102. For example only, the fuel quality value may be the product of the torque ratio and the ΔRPM ratio. The fuel quality calculation module 318 provides the fuel quality value to a fuel quality indicator module 320.

The fuel quality indicator module 320 determines whether the open-loop mode is active based on the open-loop signal from the open-loop mode module 302. When the open-loop mode is active, the fuel quality indicator module 320 determines whether the quality of the fuel provided to the engine 102 is poor based on a comparison of the fuel quality value with a predetermined value.

For example, the fuel quality indicator module 320 may determine that the fuel quality is poor when the fuel quality value is greater than the predetermined value. The predetermined value may be set based on a minimum value for a fuel known to be of poor quality. Alternatively, the predetermined value may be set based on a maximum value for a fuel known to be of acceptable (i.e., not poor) quality. For example only, the predetermined value may be one (1.0). The fuel quality indicator module 320 generates a fuel quality signal based on the comparison, which indicates whether the fuel quality is poor.

A fueling module 322 controls amount of fuel provided to the engine 102. The fueling module 322 also receives the fuel quality signal and increases the amount of fuel provided to the engine 102 when the fuel quality is poor. The fuelling module 322 may also receive the fuel quality value and may increase the amount of fuel provided based on the fuel quality value.

For example, the fueling module 322 may include a lookup table having a mapping of fuel increase indexed by fuel quality value. For example, the amount of fuel may increase as the fuel quality value increases (above the predetermined value). However, the amount of fuel that the fueling module 322 may increase over a period of time may be limited. This limitation may be set to, for example, prevent over-fueling and minimize observable vibration.

The fueling module 322 may also receive the ΔRPM value and may increase the amount of fuel provided to the engine 102 until the ΔRPM value during a second period of time reaches a stabilization value. For example only, the stabilization value may be a predetermined value, such as 0.0. Increasing fuel until the ΔRPM value reaches the stabilization value may prevent engine stalling and/or minimize vehicle vibrations.

The fueling module 322 may decrease the amount of fuel provided to the engine 102 after the ΔRPM value reaches the stabilization value. For example only, the fueling module 322 may decrease the amount of fuel provided to the engine 102 until the ΔRPM value during a third period of time reaches a maximum value. In various implementations, the maximum value may be equal to the calibrated ΔRPM value.

Figure 4:
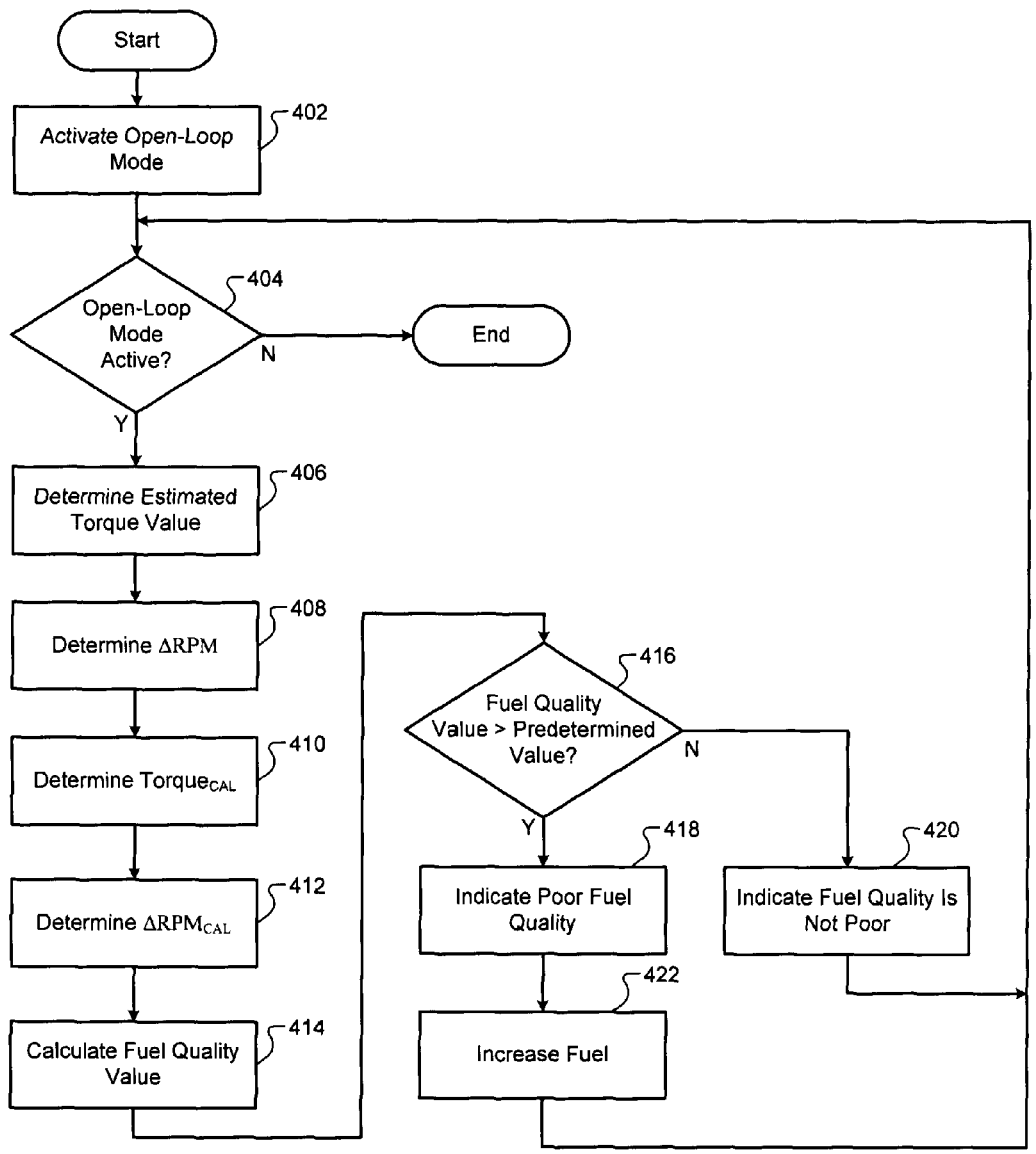
FIG. 4 is a flowchart depicting exemplary steps performed by the fuel quality module according to the principles of the present disclosure.

Referring now to FIG. 4, a flowchart depicting exemplary steps performed by the fuel quality module 250 is presented. Control begins in step 402 where control activates the open-loop mode. While in the open-loop mode, control regulates the air/fuel mixture independent of the output of the oxygen sensor 118. Control may activate the open-loop mode at a predetermined time after the engine 102 is started. Control continues in step 404 where control determines whether the open-loop mode is active. If so, control continues to step 406; otherwise, control ends.

In step 406, control determines the estimated torque value. The estimated torque value may represent torque that the engine 102 is capable of producing under the current operating conditions. For example only, control may determine the estimated torque value based on the MAF, the IAT, the ECT, the spark timing, and/or any other suitable operating condition.

Additionally, the estimated torque value may be determined based on characteristics of the engine 102, such as engine friction and/or any other suitable characteristics. Control then continues in step 408 where control determines the ΔRPM value. The ΔRPM value is the change in RPM measured over a period of time. For example only, the period of time may be defined by firing events within two of the cylinders of the engine 102.

Control continues in step 410 where control determines the calibrated torque value (torque$_{CAL}$). The calibrated torque value may represent the amount of torque that the engine 102 is capable of producing under the operating conditions when combusting fuel of a known quality. For example only, the quality of this fuel may be known to be of a minimum acceptable (i.e., not poor) quality. The calibrated torque module 310 may determine the calibrated torque value based on the MAF, the IAT, the ECT, the spark timing, and/or any suitable operating condition. The calibrated torque value may also be determined based on characteristics of the engine 102, such as engine friction and/or any other suitable characteristics.

Control continues in step 412 where control determines the calibrated ΔRPM value (ΔRPM$_{CAL}$). The calibrated ΔRPM value may represent a maximum allowable ΔRPM. For example, the calibrated ΔRPM value may be set to a maximum ΔRPM that may be experienced when combusting the fuel of known quality. In other words, the calibrated ΔRPM value may correspond to a maximum ΔRPM over the period between two firing events that may occur when the fuel of known quality is combusted in the engine 102.

Control then continues in step 414 where control calculates the fuel quality value. For example only, the fuel quality value may be calculated using the equation:

$$\text{Fuel Quality Value} = \left(\frac{\text{Estimated Torque}}{\text{Calibrated Torque}}\right) * \left(\frac{\Delta RPM}{Calibrated\ \Delta RPM}\right).$$

Control then continues in step 416 where control determines whether the fuel quality value is greater than a predetermined value. If so, control continues to step 418; otherwise, control transfers to step 420. For example only, this predetermined value may correspond to a minimum value for a fuel of poor quality. Alternatively, the predetermined value may correspond to a maximum value for a fuel of acceptable quality (i.e., not poor). In various implementations, the predetermined value may be one (1.0).

In step 418, control indicates that the fuel quality is poor. Control then continues in step 422 where control increases the amount of fuel provided to the engine 102. In various implementations, control may increase fuel provided to the engine 102 based on the fuel quality value. Control then returns to step 404. In step 420, control indicates that the fuel quality is not poor and control returns to step 404.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, comprising:
   a fuel quality calculation module that calculates a fuel quality value for fuel provided to an engine based on a predetermined torque of said engine for a known fuel quality; and
   a fueling module that selectively increases an amount of fuel provided to said engine based on said fuel quality value.

2. The engine control system of claim 1 wherein said fueling module increases said amount of fuel when said fuel quality value is greater than a predetermined value.

3. The engine control system of claim 1 wherein said fuel quality calculation module calculates said fuel quality value based on an estimated torque of said engine and a first change in engine speed (RPM) measured over a first period.

4. The engine control system of claim 3 wherein said estimated torque is based on said first period.

5. The engine control system of claim 4 wherein said fuel quality calculation module calculates said fuel quality value further based on a calibrated RPM change for said first period.

6. The engine control system of claim 5 wherein said calibrated RPM change is set based on said fuel quality value.

7. The engine control system of claim 3 wherein said fueling module decreases said amount of said fuel provided to said engine when a second RPM change measured over a second period is less than a predetermined RPM change, and wherein said second period is after said first period.

8. The engine control system of claim 1 further comprising an open-loop mode module that selectively activates and deactivates an open-loop mode of an engine controller and that prevents said fueling module from increasing said amount of said fuel while an open-loop mode is deactivated.

9. The engine control system of claim 1 wherein said fueling module determines an increased amount of said fuel based on said fuel quality value and increases said amount of fuel based on said increased amount.

10. The engine control system of claim 1 wherein said fuel quality value corresponds to a driveability index (DI) value.

11. A method for controlling an engine, comprising:
    calculating a fuel quality value for fuel provided to said engine based on a predetermined torque of said engine for a known fuel quality; and
    selectively increasing an amount of fuel provided to said engine based on said fuel quality value.

12. The method of claim 11 wherein said amount of fuel is increased when said fuel quality value is greater than a predetermined value.

13. The method of claim 11 wherein said fuel quality value is calculated based on an estimated torque of said engine and a first change in engine speed (RPM) measured over a first period.

14. The method of claim 13 wherein said estimated torque is estimated based on said first period.

15. The method of claim 14 further comprising calculating said fuel quality value further based on a calibrated RPM change for said first period.

16. The method of claim 15 wherein said calibrated RPM change is set based on said fuel quality value.

17. The method of claim 13 further comprising decreasing said amount of said fuel provided to said engine when a second RPM change measured over a second period is less than a predetermined RPM change,
    wherein said second period is after said first period.

18. The method of claim 11 further comprising:
    selectively activating and deactivating an open-loop mode of an engine controller; and
    preventing said increasing said amount of fuel while said open-loop mode is deactivated.

19. The method of claim 11 further comprising determining an increased fuel amount based on said fuel quality value, wherein said amount of fuel is increased based on said increased fuel amount.

20. The method of claim 11 wherein said fuel quality value corresponds to a driveability index (DI) value.

21. The engine control system of claim 1 wherein said fuel quality value is based on a torque ratio.

22. The method of claim 11 wherein said fuel quality value is based on a torque ratio.

* * * * *